(12) United States Patent
Pinheiro e Mota (10) Patent No.: US 10,084,987 B2
(45) Date of Patent: Sep. 25, 2018

(54) REMOTE CONTROL OF DISTRIBUTED VIDEO PRESENTATIONS ON A PLURALITY OF VIEWER SYSTEMS

(71) Applicant: International Business Machines Corporation, Armonk, NY (US)

(72) Inventor: Helio L. Pinheiro e Mota, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/257,965

(22) Filed: Sep. 7, 2016

(65) Prior Publication Data
US 2018/0070049 A1    Mar. 8, 2018

(51) Int. Cl.
| | | |
|---|---|---|
| *H04N 7/14* | (2006.01) | |
| *H04N 7/15* | (2006.01) | |
| *H04N 21/4788* | (2011.01) | |
| *H04N 21/482* | (2011.01) | |
| *H04N 21/60* | (2011.01) | |

(52) U.S. Cl.
CPC ............. *H04N 7/147* (2013.01); *H04N 7/15* (2013.01); *H04N 7/152* (2013.01); *H04N 21/4788* (2013.01); *H04N 21/4823* (2013.01); *H04N 21/4826* (2013.01); *H04N 21/60* (2013.01)

(58) Field of Classification Search
CPC ............. G06F 17/30873; G07F 11/002; G06Q 10/109; G06Q 10/10; G06Q 30/02; G09B 7/02; H04M 3/567; H04N 21/47815; H04N 21/64322; H04N 7/10; H04N 7/17318; H04N 7/147; H04N 7/152; H04N 21/4788; H04N 21/4823; H04N 21/4826; H04N 21/60
See application file for complete search history.

(56) References Cited

U.S. PATENT DOCUMENTS

| | | | |
|---|---|---|---|
| 5,866,764 A | | 2/1999 | Gabor et al. |
| 6,155,840 A | * | 12/2000 | Sallette .................... G09B 7/02 434/323 |

(Continued)

OTHER PUBLICATIONS

Unknown; "Method for Distributed Low-Latency Web Conference: Screen Sharing, Recording, and Playback"; IPCOM000219782D; Publication Date: Jul. 12, 2012; Copyright 2009-2015 IP.com I, LLC; Printed May 21, 2015; <https://priorart.ip.com/IPCOM/000219782>.

*Primary Examiner* — Le H Luu
(74) *Attorney, Agent, or Firm* — Louis J. Percello; Hoffman Warnick LLC (57) ABSTRACT

A system, method and program product for a distributed video presentation with presenter system control of video on viewer systems. The presenter system and the plurality of distributed viewer systems have a presentation application for viewing a video in a presentation mode. At least one video data channel is established for serving the video to the plurality of distributed viewer systems during the presentation mode. At least one video control signal channel is established for controlling display of the video on the plurality of distributed viewer systems. Each of the video data channels is separate from all of the video control signal channels and the presenter system has sole control over the at least one video control signal channel to control display of the video on the plurality of distributed viewer systems.

20 Claims, 6 Drawing Sheets

(56) References Cited

U.S. PATENT DOCUMENTS

| | | | |
|---|---|---|---|
| 6,728,753 B1* | 4/2004 | Parasnis | G06Q 10/109 709/203 |
| 6,757,907 B1 | 6/2004 | Shumacher et al. | |
| 7,453,488 B2 | 11/2008 | Parker et al. | |
| 9,521,375 B2* | 12/2016 | Beaumier | G07F 11/002 |
| 2005/0144284 A1* | 6/2005 | Ludwig | H04M 3/567 709/226 |
| 2007/0283380 A1* | 12/2007 | Aoki | H04N 7/10 725/32 |
| 2008/0126943 A1* | 5/2008 | Parasnis | G06Q 10/10 715/730 |
| 2009/0313329 A1 | 12/2009 | Agrawal et al. | |
| 2010/0037151 A1 | 2/2010 | Ackerman et al. | |
| 2010/0251281 A1* | 9/2010 | Craner | H04N 7/17318 725/23 |
| 2010/0257456 A1* | 10/2010 | Lieb | G06Q 10/10 715/741 |
| 2014/0189762 A1 | 7/2014 | Hainline | |
| 2014/0215507 A1* | 7/2014 | Wouhaybi | G06Q 30/02 725/14 |
| 2015/0135214 A1* | 5/2015 | Reisman | H04N 21/64322 725/37 |
| 2015/0143395 A1* | 5/2015 | Reisman | G06F 17/30873 725/14 |
| 2015/0181303 A1* | 6/2015 | Amano | H04N 21/47815 725/34 |
| 2016/0127802 A1* | 5/2016 | Carney | G06Q 30/02 725/14 |

* cited by examiner

REMOTE CONTROL OF DISTRIBUTED VIDEO PRESENTATIONS ON A PLURALITY OF VIEWER SYSTEMS

TECHNICAL FIELD

The subject matter of this invention relates to distributed video presentation systems, and more particularly to a remote controller for presentation of video on distributed systems.

BACKGROUND

Video is a valuable medium for presenting and receiving feedback on ideas and data. Video is often incorporated in presentations that include a variety of media, including graphical slides with text and images, audio, animations, and interactive components, such as audio/video conferencing, messaging, whiteboard, annotation, polling, and other features. Various online, network, and mobile applications have been developed for virtual meetings and the presentation of materials to distributed viewers through a variety of connected devices, such as personal computers, tablets, smartphones, video conferencing systems, etc.

Presentation media, including video, is generally served from the presenter's system or a remote host system for the presentation application. The presenter controls the flow of the media, such as playing, pausing, forward, reverse, etc., and attempts to guide viewers and related interactions and discussion based on the hope that each viewer is seeing the same frames of video in an approximately synchronous fashion. However, the reality of serving video is highly dependent on bandwidth, processing, and other delays that may create lag in distributed viewer systems. Alternatively, the presenter may distribute media files or links to geographically distributed video servers that enable the viewer to access and control video replay at will. The hope is that audio or other cues during the presentation will encourage viewers to watch the video when instructed by the presenter, but the presenter effectively loses control of the video content and synchronization of playback.

Video-on-demand systems may enable distribution of video content from locations geographically closer to each viewer system to minimize lag for each viewer. However, this may only increase lag disparities among individual systems, particularly in the event that one or more viewers are not close to any available server (such as in an underserved country or remote area), are using a bandwidth or processing constrained device, or have other lag producing issues.

SUMMARY

Aspects of the disclosure provide a distributed video presentation with presenter system control of video on viewer systems. The presenter system and the plurality of distributed viewer systems have a presentation application for viewing a video in a presentation mode. At least one video data channel is established for serving the video to the plurality of distributed viewer systems during the presentation mode. At least one video control signal channel is established for controlling display of the video on the plurality of distributed viewer systems. Each of the video data channels is separate from all of the video control signal channels and the presenter system has sole control over the at least one video control signal channel to control display of the video on the plurality of distributed viewer systems.

A first aspect discloses a video presentation system. A plurality of distributed viewer systems have a presentation application for viewing a video in a presentation mode. At least one video server establishes at least one video data channel for serving the video to the plurality of distributed viewer systems during the presentation mode. A presenter system establishes at least one video control signal channel for controlling display of the video on the plurality of distributed viewer systems. Each of the at least one video data channel is separate from all of the at least one video control signal channel and the presenter system has sole control over the at least one video control signal channel to control display of the video on the plurality of distributed viewer systems.

A second aspect discloses a computer program product stored on a computer readable storage medium, which when executed by a computing system, provides a video presentation system. Program code identifies a presenter system and a plurality of distributed viewer systems having a presentation application for viewing a video in a presentation mode. Program code also establishes at least one video data channel for serving the video to the plurality of distributed viewer systems during a presentation mode. Program code also establishes at least one video control signal channel for controlling display of the video on the plurality of distributed viewer systems. Each of the at least one video data channel is separate from all of the at least one video control signal channel and the presenter system has sole control over the at least one video control signal channel to control display of the video on the plurality of distributed viewer systems.

A third aspect discloses a computerized method. A presentation mode is selected to identify a presenter system and a plurality of distributed viewer systems having a presentation application for viewing a video in the presentation mode. At least one video data channel is established for serving the video to the plurality of distributed viewer systems during the presentation mode. At least one video control signal channel is established for controlling display of the video on the plurality of distributed viewer systems. Each of the at least one video data channel is separate from all of the at least one video control signal channel and the presenter system has sole control over the at least one video control signal channel to control display of the video on the plurality of distributed viewer systems. The video is controllably displayed on the plurality of distributed viewer systems using the presenter system during the presentation mode.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
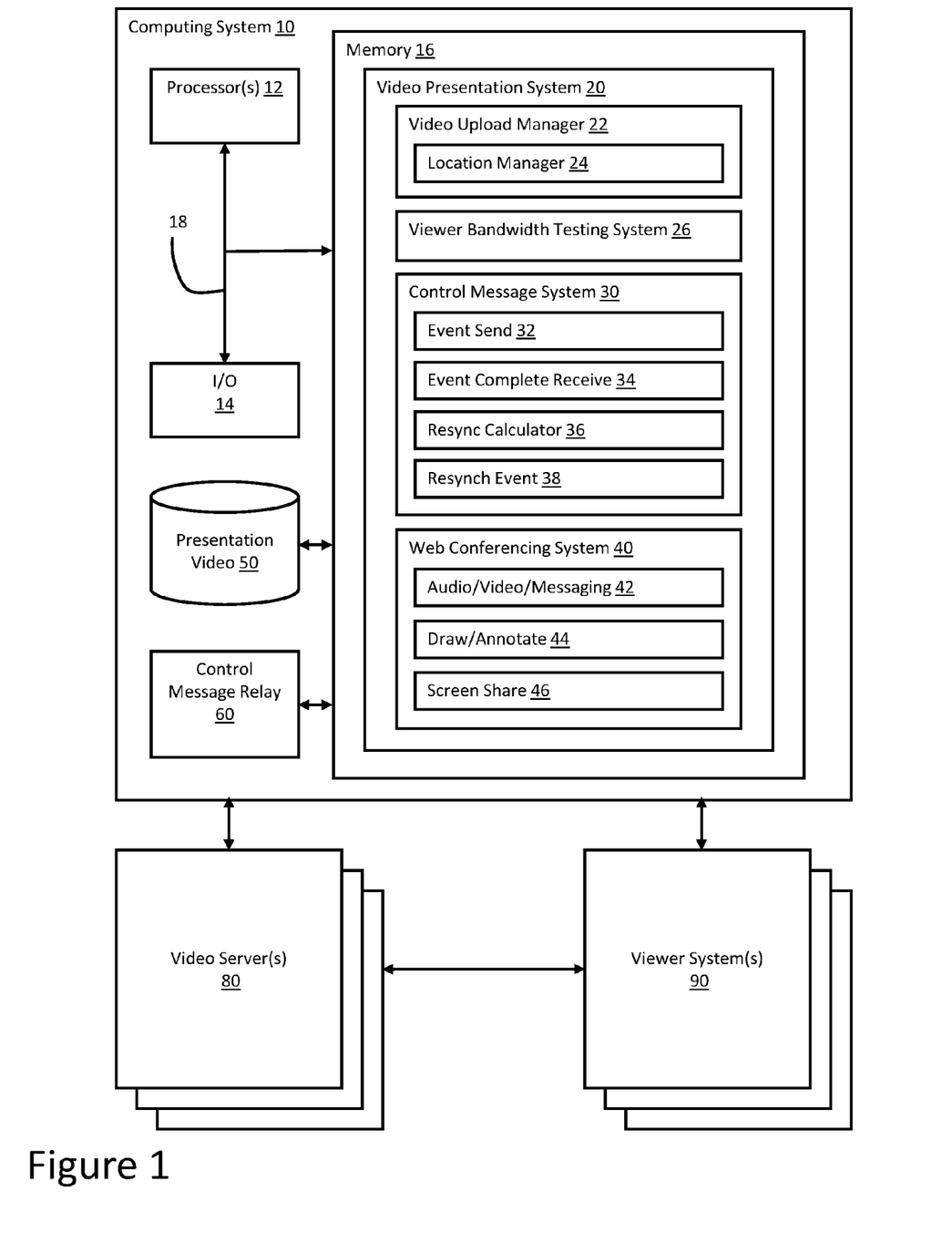
FIG. 1 shows an example presentation system according to embodiments.

Referring now to the drawings, FIG. 1 depicts a computing system 10 having a video presentation system 20 and in communication with a plurality of video servers 80 and viewer systems 90. Both video servers 80 and viewer systems 90 may be geographically distributed and independently controlled systems in a plurality of distinct locations with varying communications bandwidth, processing power, buffering capacity, and other considerations for video display. In some embodiments, each of video servers 80 and viewer systems 90 are separate computer systems maintained by different users. For example, video servers 80 may be video-on-demand servers maintained by a video provider company with a geographically distributed network of high-performance servers for serving video content to end users. Viewer systems 90 may be end user devices, such as work or home computer systems (desktop or laptop), smartphones, tablets, or other end user computer systems.

Video presentation system 20 may comprise one or more software applications, modules, or components of other software applications that enable a user of computing system 10 to be a presenter system for controllably displaying a video on distributed viewer systems 90 through using video servers 80 to establish a video data channel separate from a control message channel. In some embodiments, video presentation system 20 may be similar to viewer systems 90 except when operating in a presentation mode where computing system 10 is identified as the presenter system and viewer systems 90 are identified as viewer systems. Similarly, each of viewer systems 90 may be running a video presentation system similar to video presentation system 20, but in a viewer mode rather than a presenter mode.

Video presentation system 20 may include a video upload manager 22 that enables video presentation system 20 to upload a presentation video 50 to one or more of video servers 80. For example, the video presentation system 20 may be in communication with one or more video distribution networks or service providers (including video servers 80) and may provide an interface for selecting, uploading, and managing presentation video 50, including one or more video files for use during a future presentation. In some embodiments, video upload manager 22 may include a location manager 24 that enables video presentation system 20 to identify and select a plurality of video servers 80 by geographic location. A user of video presentation system 20 may identify the location of video servers 80 that will receive and host copies of presentation video 50, which may include selecting video servers that are geographically close to intended viewer systems 90 and/or eliminating or de-selecting video servers that are geographically remote from viewer systems 90 or in locations that are regarded as business, privacy, or data security risks. Example operation of video upload manager 22 is further described below with regard to FIG. 4.

Video presentation system 20 may include a viewer bandwidth testing system 26 that enables combinations of viewer systems 90 and video servers 80 to be tested for video playback performance. In some embodiments, viewer bandwidth testing system 26 may be enabled by the user of the presenter system following video upload to allow viewer systems 90 to test and select their preferred video servers. For example, a message may be sent to one or more video servers 80 in proximity to each viewer system to initiate background playback of the presentation video or a test video with similar video characteristics (format, frame rate, compression, encoding, file size, resolution, etc.). The video playback will be measured by the viewer system and used to compare and rank the available video servers 80. In some embodiments, viewer systems 90 may be able to initiate viewer bandwidth testing from their own systems based upon receiving an invitation to a video presentation or notice of a web conference in which the video will be presented. In some embodiments, this feature is triggered prior to a scheduled video presentation but close in time to the video presentation to minimize time-based variations in available bandwidth and other considerations for video playback.

Video presentation system 20 may include a control message system 30 for initiating and controlling video playback on viewer systems 90. For example, computing system 20 may be identified as the presenter system during a presentation mode and thereby be given exclusive control over video playback by issuing control messages to the viewer systems 90 using the video control message channel. This may enable the video presentation system 20 to control video playback on viewer systems 90 without directly serving the video data or even communicating with video servers 80 during presentation mode. Control message system 30 may enable a variety of video playback control features, such as play, pause, stop, fast-forward, slow-forward, reverse (and various speeds of reverse), setting a cue location, going to a cue location, looping between cue locations, skipping between cue locations, and adding, displaying, and editing various video overlays, such as annotations or drawings. The available control messages may be determined by the variety of control events available on both the presenter and viewer video playback systems. In some embodiments, each video playback control feature may correspond to one or more control events and each control event may include one or more parameters for executing that event on the viewer systems. Control message system 30 has an event send module 32 that identifies an event selected by the presenter system and sends a corresponding event message to each of the viewer systems 90. Control message system 30 may then wait for confirmation that the event has been processed and completed by each viewer system 90 with event complete receive function 34. For example, control message system 34 may monitor the video control message data channel for an event complete message from each viewer system 90. The event complete messages may include parameters for tracking the viewer system and control event being confirmed, along with frame and/or time data related to when the event executed on each viewer system. In some embodiments, parameters describing the state of video playback on each viewer system may be included in the event complete messages or may be provided as a separate message for periodic monitoring of synchronization among presenter and viewer systems. Data received describing the state of video playback on each viewer system may enable a resync calculator 36 to calculate which viewer systems are lagging and the magnitude of that lag. Based on the calculated lag of the slowest viewer system, the video presentation system 20 may issue a message for a resynch event, such as a go-to-cue or pause for a fixed duration event, calculated for each of the viewer systems 90 to resynchronize the video presentation among viewers.

Note that in some embodiments this may mean that different control messages are sent to different viewer systems 90, based on the state of video playback data for that viewer. Initiating a resync event may be automated by video presentation system 20 if an unacceptable difference in playback synchronization is detected (lag threshold) or may be available to the presenter as a control option to select one or more types of presentation resync events corresponding to resynch event 38. In some embodiments, control message system 30 may send and receive event messages through a control message relay 60 that controls routing, queuing, and temporary storage for the video control message data channel.

Video presentation system 20 may include a web conferencing system 40, such as an existing web conferencing application, with a variety of web conferencing features to support the video presentation. In some embodiments, web conferencing system 40 will include a plurality of communication channels between the presenter system and viewer systems 90. For example, audio, video, and messaging 42 may include an audio conferencing channel through computing system 10 and/or its peripherals (e.g., speaker and microphone) or a separate telephone apparatus or channel. Similarly, audio, video, and messaging 42 may include a video conferencing channel through computing system and/or its peripherals (e.g. camera, display, speaker, and microphone) or a separate video conferencing system or channel. Audio, video, and messaging 42 may also include an embedded chat, message board, or texting feature to enable text communication among participants in the video presentation. Web conferencing system 40 may include one or more draw/annotate features 44 that enable the presenter and/or viewers to create graphical or text elements on a white board (i.e., designated drawing area of a graphical interface) and/or overlay graphical or text elements over other presentation media, such as slide presentations, documents, or presentation video 50. In some embodiments, the draw/annotate may enable graphical elements to be tied to cues in the video and communicated as a parameter through control message system 30. Web conferencing system 40 may include a screen share feature 46 common to many web conferencing applications. Note that screen share 46 may not be used for presentation video 50 due to the lag and inconsistent playback created by many screen sharing features.

Figure 2:
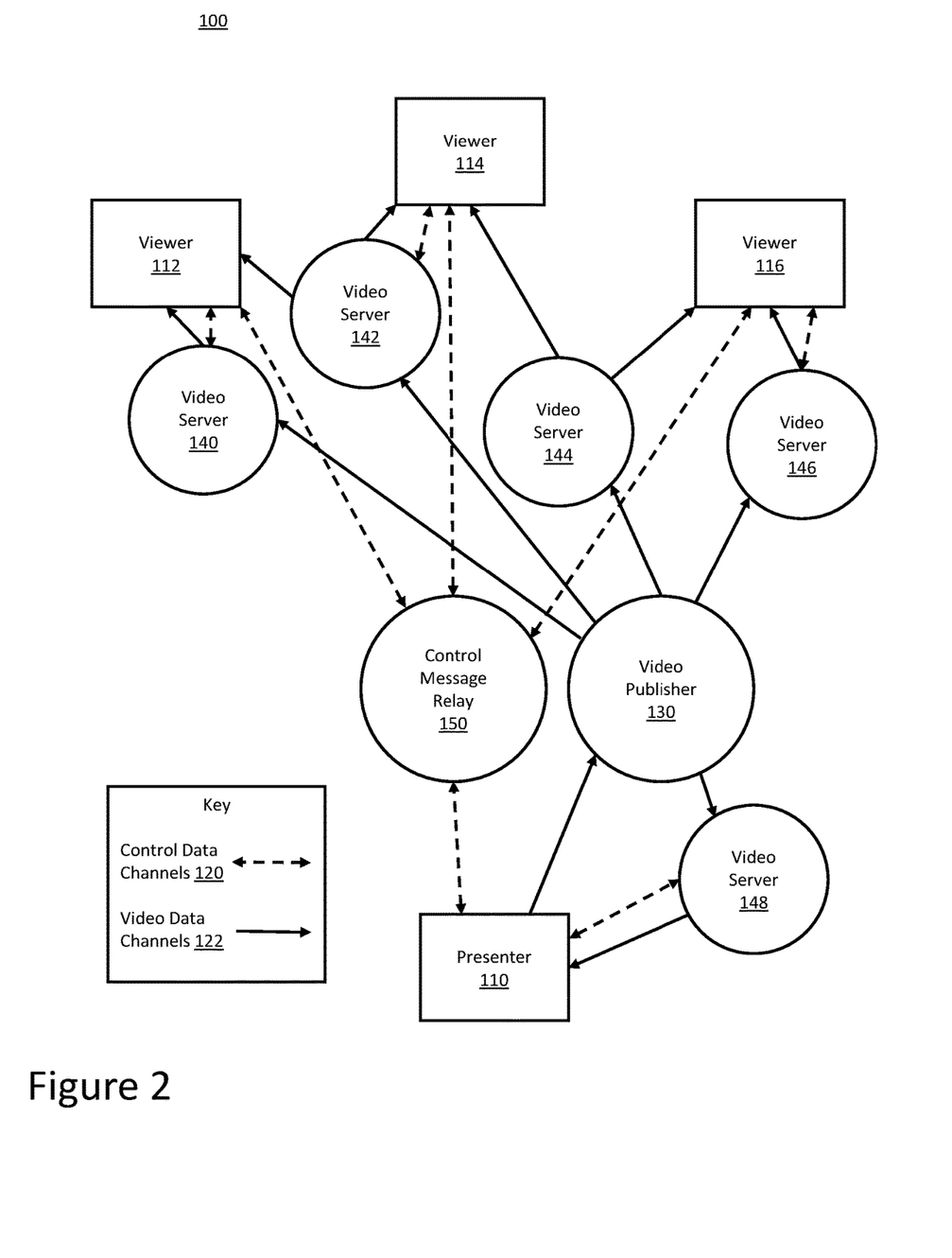
FIG. 2 shows an example network for a presentation system according to embodiments.

FIG. 2 depicts an example network 100 for a video presentation system, such as video presentation system 18 in FIG. 1. For example, presenter system 110 may include one or more applications including a video presentation system as described above. Network 100 may be a geographically distributed network operating on standard internet protocols or more include a more proprietary network, such as a corporate intranet on a virtual private network. Presenter system 110 may communicate with a plurality of viewer systems 112, 114, 116 in network 100. Presenter system 110 and viewer systems 112, 114, 116 may be connected by a variety of data channels, such as video control data channels 120 and video data channels 122. For example, event messages and state of video playback messages may be routed exclusively through video control data channels 120 during presentation mode and video data (video, audio, and related metadata) may be routed exclusively through video data channels 122. In some embodiments, video control data channels 120 may all pass through a control message relay 150. In some embodiments, video data channels 122 may all pass through a video publisher 130 and one or more video servers 140, 142, 144, 146, 148. Note that control data channels 120 are depicted as bidirectional channels to reflect event messages, including event complete messages, and state of video playback messages passing between presenter system 110 and viewer systems 112, 114, 116, while video data channels 122 are generally single direction reflecting the video data being transferred from presenter system 110 to video publisher 130 to video servers 140, 142, 144, 146, 148 to viewer systems 112, 114, 116 with limited need for return communication. However, it will be understood that some bidirectional communication may occur as part of video transfer protocols and related protocols for establishing and maintaining video data channels 122. Viewer systems 112, 114, 116 may also establish a control message channel with their respective video servers in order to control download and buffering of video data.

Network 100 may include a plurality of video servers 140, 142, 144, 146, 148, such as the distributed servers of a video-on-demand system. Each of presenter system 110 and viewer systems 112, 114, 116 may be in proximity to one or more of video servers 140, 142, 144, 146, 148. Each of presenter system 110 and viewer systems 112, 114, 116 may be end user devices running a video presentation system with presenter system 110 operating in a presentation mode and each end user device having a different geographic and physical location, different network connections, and different memory, processing, security, or other constraints on receiving video and/or other data. Distributed systems are computer systems that have independent memory, processing, display, and network communication subsystems and geographically distributed systems are located in different physical locations with different levels of network connectivity, interfacing with different physical data channels, and/or routed through different network paths, such as different server hubs and/or carrier systems. Network 100 is an example showing an arbitrary number of network components and it will be understood that network 100 may scale to any number of user systems, video servers, video publishers, and control message relays.

Figure 3:
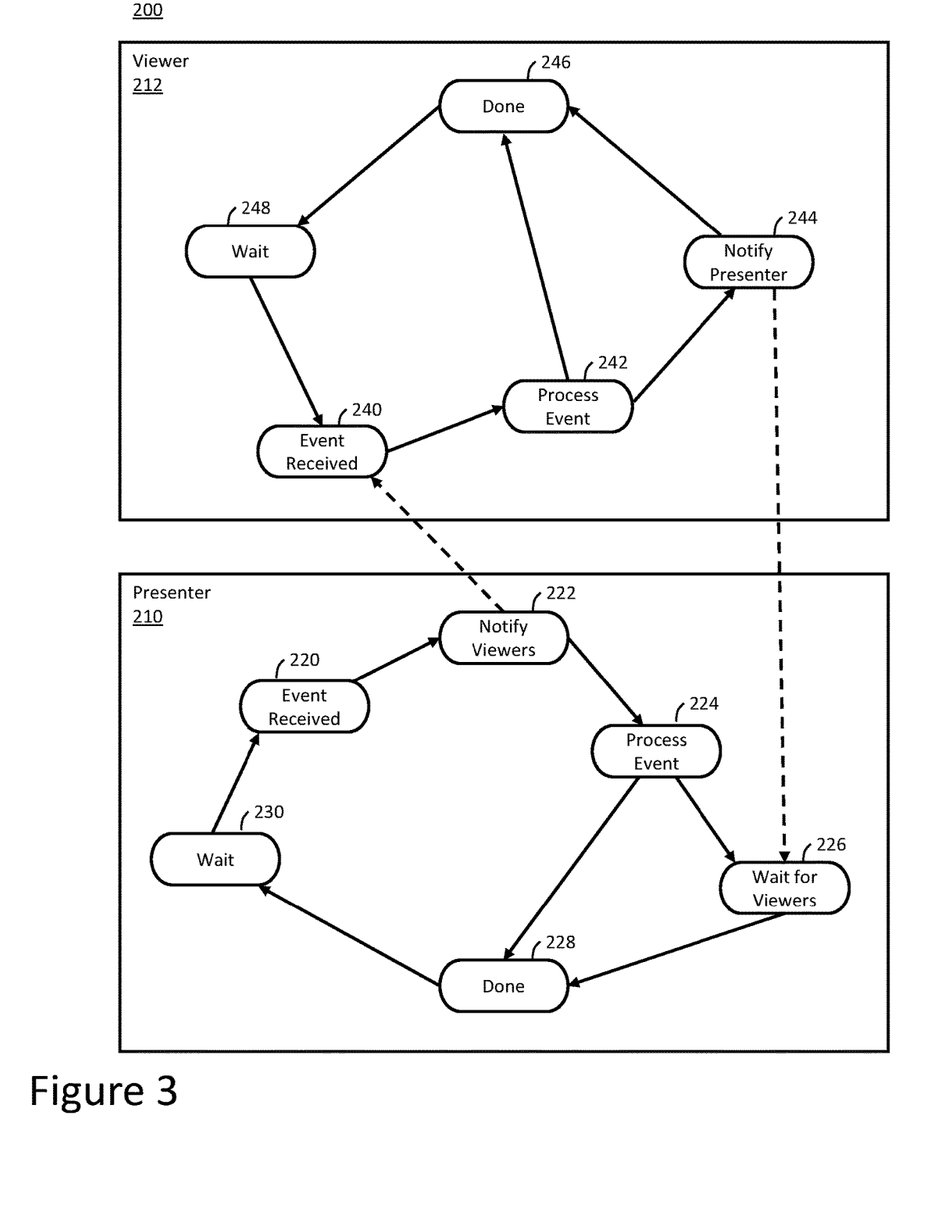
FIG. 3 shows an example state diagram for a presentation system according to embodiments.

FIG. 3 depicts an example state diagram 200 for a presentation system, such as video presentation system 18 in FIG. 1. For example, presenter system 210 may be a computer system running one or more applications for a video presentation system in presentation mode and viewer system 212 may be a computer system running one or more applications for a video presentation system in a viewer mode. State diagram 200 may assume that video data channels and video control message channels have already been established, video data is ready to be served from appropriate video servers, and the presentation mode has already been established with participant viewer systems. For example, all viewers and the presenter may have previously logged into a web conferencing application at the appropriate time and with appropriate access codes to establish web conferencing communications and the presenter system has been given authority to initiate the video presentation in presentation mode.

An event received state 220 occurs when presenter system 210 receives user input to initiate or otherwise control the video presentation. For example, the user of presenter system 210 presses play, pause, reverse, etc. on a video player interface on presenter system 210. A notify viewers state 222 occurs when presenter system 210 sends an event message to viewer system 212 through a video control message channel. Presenter system 210 proceeds to a process event state 224 once the event message (or messages) are sent and processes the event. While the event is being processed by presenter system 210, it may also enter a wait for viewers state 226 where it waits for an event complete message from viewer system 212 (and all other viewer systems). Once the event is processed by presenter system 210 and event complete messages are received from all viewer systems, presenter system 210 enters a done state 228, where it may complete any necessary storage or processing remaining to resolve event processing and prepare for a next event, then proceed to a wait state 230 until another event is received. In some embodiments, there may be system generated events, such as system or network interruptions, that may also initiate an event message cycle.

Viewer system 212 may not have the ability to receive user initiated events related to presentation of video in the presentation mode. Viewer system 212 has effectively given control over video display to presenter system 210 and video playback in the presentation mode relies on event messages received from presenter system 210 through the video control message data channel. An event received state 240 is entered when an event message is received from presenter system 210. A process event state 242 is entered by viewer system 212 as it processes the received video control message. When processing is complete, a notify presenter state 244 is entered and operation proceeds to a done state 246. Any necessary end steps for preparing to receive the next event message may be completed in done state 246 and viewer system 212 will then enter a wait state 248 to monitor the video control message data channel for the next control vent message.

Figure 4:
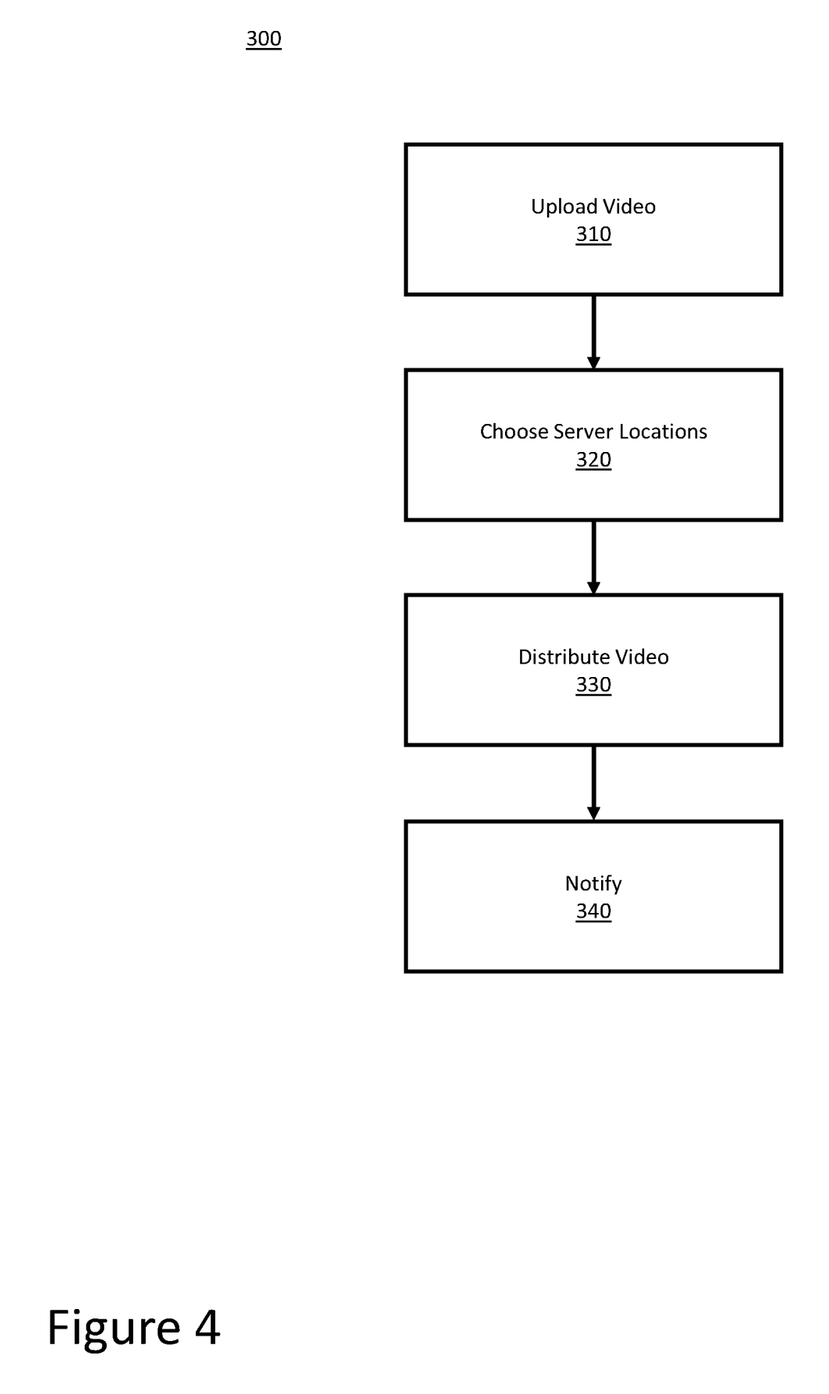
FIG. 4 shows an example method of establishing a video channel according to embodiments.

FIG. 4 depicts an example method 300 of establishing a video channel between a presenter system and any number of viewer systems using a video presentation system, such as video presentation system 18 in FIG. 1. This method 300 may be completed asynchronously from the actual presentation mode, such that video data is already present in appropriate video servers or even the viewer systems by the time the presentation is actually initiated. In step 310, the presenter system uploads video to a network location for distribution to a plurality of video servers. For example, the presenter system may upload one or more presentation videos to a video publisher, such as a video-on-demand system. In step 320, the presenter system may choose video server locations to receive the uploaded video. For example, the presenter system may select from the video servers or geographic regions available, which are likely to be closest to the intended viewer systems and do not otherwise conflict with data security or other business considerations. In step 330, the video data files are distributed to the video servers selected. For example, the video publisher may distribute the video to the selected video servers in accordance with the video-on-demand distribution protocols, such that it is ready for download and presentation on viewer systems. In step 340, notification is provided to both presenter and viewer systems that the video is available for the presentation. For example, once distribution is confirmed, the video publisher may notify the presenter system and/or the viewer systems via e-mail (or other messaging) or a status indicator (or similar indication) in the presentation or web conferencing application. In some embodiments, the presenter system may wait for notice that the presentation video has reached the video servers before inviting viewer systems to the presentation.

Figure 5:
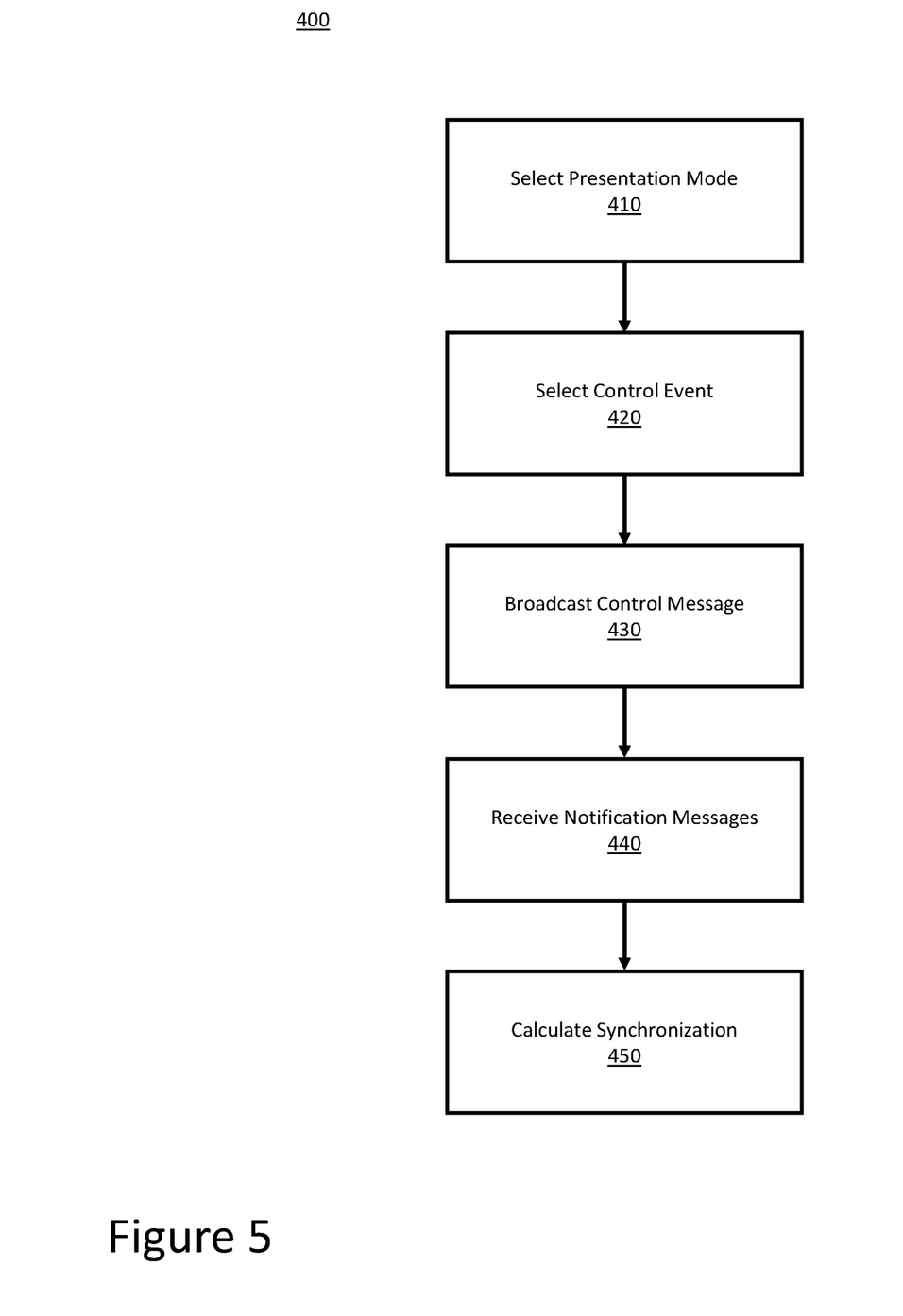
FIG. 5 shows an example method of controllably displaying a video according to embodiments.

FIG. 5 is an example method 400 of controllably displaying a video presentation using a video presentation system, such as video presentation system 18 in FIG. 1. In step 410, a presentation mode is selected by the presenter system. For example, the presenter system may have been the video presentation system that initiated and/or organized the video presentation and, thereby, have control for initiating the presentation mode or the presenter system may be given control by another organizer or initiator of the web conference in which the video presentation is to be delivered. In step 420, the presenter system selects a control event, such as play, stop, reverse, go to cue, etc. For example, the presenter system may include a video player interface with conventional video controls and the presenter may select the desired control, such as clicking on the play button. In step 430, a control message correlating to the selected event is broadcast to the viewer systems through the video control message data channel. For example, a control message indicating the play event and with a parameter for the starting position may be sent to all viewer systems through a control message relay. In step 440, notification messages are received by the presenter system from the viewer systems related to the previously sent control message. For example, the notification messages received may include one or more control event complete messages with parameters and/or separate messages indicating the state of playback on each of the viewer systems. In step 450, the presenter system may use parameters from the received notification messages from each viewer system to calculate an estimated degree of synchronization among the viewer systems, such as the variance in timestamps or video frame references from the leading, lagging, and/or median positions. In some embodiments, the results of the synchronization calculation may be provided through the presenter interface to give the presenter a sense of how well synchronized the viewer systems are and enable corrective action, such as pausing video until lagging systems catch up or issuing a go-to-cue event in an attempt to resynchronize the video, particularly as it relates to other presentation information or discussion via audio or video conference. In some embodiments, the video presentation system may provide a user option for automatically issuing a control message calculated to improve synchronization of the systems.

Figure 6:
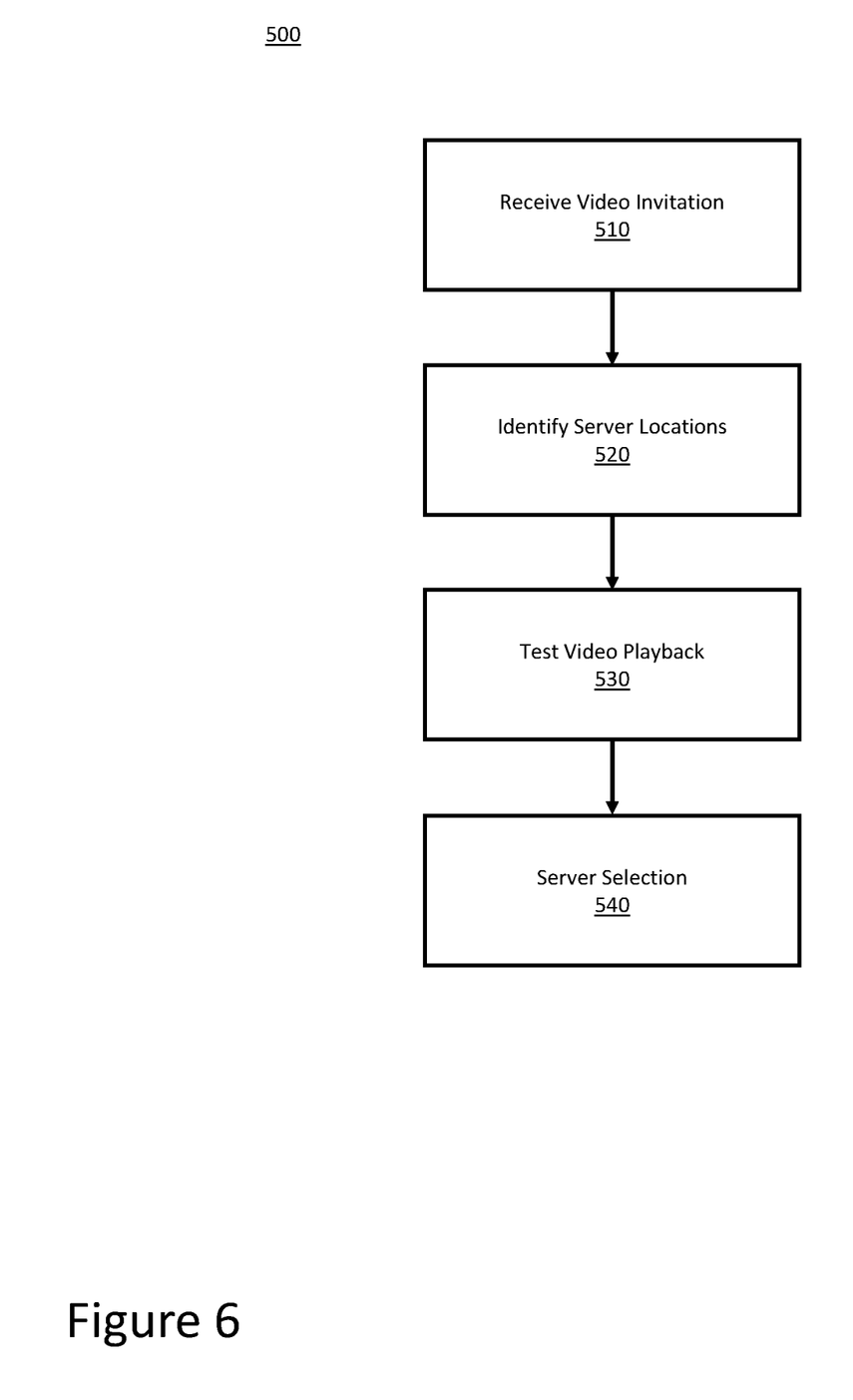
FIG. 6 shows an example method of selecting a video server according to embodiments.

FIG. 6 depicts an example method 500 of selecting a video server using a video presentation system, such as video presentation system 18 of FIG. 1. Selection of a video server may be performed outside of presentation mode and prior to the video presentation. In step 510, a viewer system receives a video invitation or other notice of a future video presentation to which they may have access. For example, as part of a meeting invitation for a web conference, the viewer system may receive notice that a video presentation will be included in the meeting and the viewer system should be configured for video playback. In step 520, the viewer system will identify the available video server locations capable of serving the video. For example, within the invitation or through a separate interface for configuring video playback, the viewer system may be provided with a list of video servers, along with their location and other factors relevant to playback performance, data security, or other business considerations. In step 530, the viewer system may test video playback with the identified servers to quantify the quality of video delivery. For example, each identified video server may, in turn, serve a test video with characteristics relevant to quantifying video display quality or the presentation video itself. In some embodiments, this testing will be run in the background of the viewer system, rather than actually displaying the video on the viewer system's interface. In step 540, the viewer system may select the preferred server or servers for receiving the video presentation during presentation mode. For example, the viewer system may receive data calculated from the video playback tests for each video server to quantify and rank their respective video playback performances. The viewer system may then use this information to select the desired server. In an alternate embodiment, the best performing server is selected automatically from among the identified servers without any user interaction and the server selection is then used by the video presentation system. For example, a video publisher may initiate the video server testing for each viewer system and select the preferred video server on the basis of that test to configure which video server will serve which viewer systems during presentation mode.

It is understood that video presentation system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 18. In general, processor(s) 12 execute program code which is at least partially fixed in memory 16. While executing program code, processor(s) 12 can process data, which can result in reading and/or writing transformed data from/to memory and/or I/O 14 for further processing. The pathway 18 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the video presentation system 20 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A video presentation system, comprising:
   a plurality of distributed viewer computer devices having a presentation application for viewing a video in a presentation mode;
   at least one video server, each video server comprising a computer device, establishing at least one video data channel for serving the video to the plurality of distributed viewer computer devices during the presentation mode; and
   a presenter computer device establishing at least one video control signal channel for controlling display of the video on the plurality of distributed viewer computer devices, wherein each of the at least one video data channel is separate from all of the at least one video control signal channel and the presenter computer device has sole control over the at least one video control signal channel to control display of the video on the plurality of distributed viewer computer devices.

2. The video presentation system of claim 1, further comprising a control message relay, wherein the at least one video control signal channel is processed through the control message relay before being received by the plurality of distributed viewer computer devices during the presentation mode.

3. The video presentation system of claim 1, wherein the presenter computer device and the plurality of distributed viewer computer devices are each running a common web conferencing application and a plurality of web conferencing features selected from audio conferencing, video conferencing, messaging, whiteboard, or annotation are available through the common web conferencing application during the presentation mode.

4. The video presentation system of claim 1, wherein the plurality of distributed viewer computer devices include a notification signal channel communicating a state of video display message and a control event complete message to the presenter computer device in response to a control event message from the presenter computer device through the at least one video control signal channel.

5. The video presentation system of claim 4, wherein the presenter computer device receives the state of video display message from each of the plurality of distributed viewer computer devices and calculates a synchronization cue based on a greatest frame delay among the plurality of distributed viewer computer devices and generates a cue event control message through the at least one video control signal channel.

6. The video presentation system of claim 1, further comprising a video publisher system in communication with the plurality of video servers and wherein each of the plurality of distributed viewer computer devices receives a test video from the plurality of video servers, the video publisher system calculates a video lag for each of the plurality of video servers for each of the plurality of distributed viewer computer devices, and selects a preferred video server from among the plurality of video servers for each of the plurality of distributed viewer computer devices.

7. The video presentation system of claim 1, wherein the presenter computer device establishes a first data channel for the at least one video data channel, a second data channel for the at least one video control signal channel, and a third data channel for video presentation data cued to the at least one video control signal channel and displaying annotations to the video on the plurality of distributed viewer computer devices, wherein the first data channel and the second data channel originate from separate computer devices during the presentation mode.

8. A computer program product stored on a non-transitory computer readable storage medium, which when executed by a computing device, provides a video presentation system, the program product comprising:
   program code that identifies a presenter computer device and a plurality of distributed viewer computer devices having a presentation application for viewing a video in a presentation mode;
   program code that establishing at least one video data channel for serving the video to the plurality of distributed viewer computer devices during a presentation mode; and
   program code that establishes at least one video control signal channel for controlling display of the video on the plurality of distributed viewer computer devices, wherein each of the at least one video data channel is separate from all of the at least one video control signal channel and the presenter computer system has sole control over the at least one video control signal channel to control display of the video on the plurality of distributed viewer computer devices.

9. The program product of claim 8, further comprising program code that establishes a control message relay, wherein the at least one video control signal channel is processed through the control message relay before being received by the plurality of distributed viewer computer devices during the presentation mode.

10. The program product of claim 8, wherein the presenter computer device and the plurality of distributed viewer computer devices are each running program code establishing a common web conferencing application and a plurality of web conferencing features selected from audio conferencing, video conferencing, messaging, whiteboard, or annotation are available through the common web conferencing application during the presentation mode.

11. The program product of claim 8, wherein the plurality of distributed viewer computer devices include a notification signal channel communicating a state of video display message and a control event complete message to the presenter computer device in response to a control event message from the presenter computer device through the at least one video control signal channel.

12. The program product of claim 11, wherein the presenter computer device receives the state of video display message from each of the plurality of distributed viewer computer devices and calculates a synchronization cue based on a greatest frame delay among the plurality of distributed viewer computer devices and generates a cue event control message through the at least one video control signal channel.

13. The program product of claim 8, further comprising program code that establishes a video publisher system in communication with the plurality of video servers and wherein each of the plurality of distributed viewer systems receives a test video from the plurality of video servers, the video publisher system calculates a video lag for each of the plurality of video servers for each of the plurality of distributed viewer computer devices, and selects a preferred video server from among the plurality of video servers for each of the plurality of distributed viewer computer devices.

14. The program product of claim 8, wherein the presenter computer device establishes a first data channel for the at least one video data channel, a second data channel for the at least one video control signal channel, and a third data channel for video presentation data cued to the at least one video control signal channel and displaying annotations to the video on the plurality of distributed viewer computer devices, wherein the first data channel and the second data channel originate from separate computer devices during the presentation mode.

15. A computerized method comprising:
selecting a presentation mode to identify a presenter computer device and a plurality of distributed viewer computer computer devices having a presentation application for viewing a video in the presentation mode;
establishing, by a video server comprising a computer device, at least one video data channel for serving the video to the plurality of distributed viewer computer devices during the presentation mode;
establishing, by the presenter computer device, at least one video control signal channel for controlling display of the video on the plurality of distributed viewer computer devices, wherein each of the at least one video data channel is separate from all of the at least one video control signal channel and the presenter computer device has sole control over the at least one video control signal channel to control display of the video on the plurality of distributed viewer computer devices;
controllably displaying the video on the plurality of distributed viewer computer devices using the presenter computer device during the presentation mode.

16. The computerized method of claim 15, further comprising a step of establishing a control message relay, wherein the at least one video control signal channel is processed through the control message relay before being received by the plurality of distributed viewer computer devices during the presentation mode.

17. The computerized method of claim 15, wherein the presenter device and the plurality of distributed viewer computer devices are each running a common web conferencing application and a plurality of web conferencing features selected from audio conferencing, video conferencing, messaging, whiteboard, or annotation are available through the common web conferencing application during the presentation mode.

18. The computerized method of claim 15, wherein the plurality of distributed viewer computer devices include a notification signal channel communicating a state of video display message and a control event complete message to the presenter computer device in response to a control event message from the presenter computer device through the at least one video control signal channel.

19. The computerized method of claim 18, wherein the presenter device receives the state of video display message from each of the plurality of distributed viewer computer devices and calculates a synchronization cue based on a greatest frame delay among the plurality of distributed viewer computer devices and generates a cue event control message through the at least one video control signal channel.

20. The computerized method of claim 15, further a step of establishing a video publisher system in communication with the plurality of video servers and wherein each of the plurality of distributed viewer systems receives a test video from the plurality of video servers, the video publisher system calculates a video lag for each of the plurality of video servers for each of the plurality of distributed viewer computer devices, and selects a preferred video server from among the plurality of video servers for each of the plurality of distributed viewer computer devices.

* * * * *